United States Patent [19]

Vit et al.

[11] 3,852,262
[45] Dec. 3, 1974

[54] METHOD OF REDUCING ORGANIC COMPOUNDS BY MEANS OF SODIUM-ALUMINUM HYDRIDES

[75] Inventors: Jaroslav Vit; Bohuslav Časewsky; Milan Mamula, all of Prague; Jiri Marčhacek, Rez, all of Czechoslovakia

[73] Assignee: Ceskoslovenska Akademie Ved, Prague, Czechoslovakia

[22] Filed: Jan. 8, 1970

[21] Appl. No.: 7,308

Related U.S. Application Data

[62] Division of Ser. No. 594,971, Nov. 10, 1966, Pat. No. 3,652,662.

[30] Foreign Application Priority Data

Nov. 13, 1965   Czechoslovakia ................. 6771-65
Mar. 26, 1966   Czechoslovakia ................. 2009-66
Mar. 26, 1966   Czechoslovakia ................. 2010-66

[52] U.S. Cl. ......... 260/205, 260/618 H, 260/638 R, 260/638 A, 260/638 B, 260/448.2 E, 260/676 R, 260/668 R, 260/689, 423/347
[51] Int. Cl. ............................................. C07b 29/00
[58] Field of Search ........... 260/205, 618 H, 638 R, 260/638 A, 689, 448 AD, 345.9, 347.8, 638 B

[56] References Cited
UNITED STATES PATENTS

| | | | |
|---|---|---|---|
| 3,060,216 | 10/1962 | Hamprecht et al. | 260/448 AD |
| 3,147,272 | 9/1964 | Brown et al. | 260/448 AD |
| 3,184,492 | 5/1965 | Cole et al. | 260/448 AD |
| 3,394,158 | 7/1968 | Chini et al. | 260/448 R |

Primary Examiner—Lorraine A. Weinberger
Assistant Examiner—C. F. Warren

[57] ABSTRACT

Various organic compounds are reduced by reaction of the said compounds in solution in an organic solvent at an elevated temperature with a reducing agent that is soluble in the said organic solvent which reducing agent is a substituted sodium aluminum hydride having the formula $NaAlH_xQ_{4-x}$ in which $x$ is an integer from 1 to 3 and Q is an organic radical derived by the removal of an active hydrogen atom from an alcohol of the group consisting of 1. tetrahydrofurfuryl alcohols,
2. tetrahydropyranyl alcohols,
3. ether alcohols having the formulae

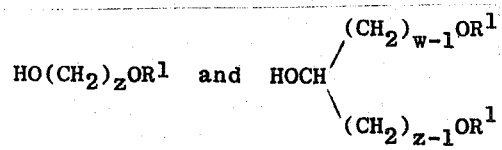

in which $R^1$ is an alkyl radical containing up to 4 carbon atoms or an aryl radical containing at least 6 and at most 8 carbon atoms and $w$ and $z$ are integers from 2 to 4, 4. polyether alcohols having the formula $HO(CH_2)_2O(CH_2)_wOR^1$ in which formula $w$, $z$ and $R^1$ has the same significance as hereinbefore, and 5. amino alcohols having the formula $R''R'''N(CH_2)_zOH$ in which $R''$ and $R'''$ are each a radical having the same significance as the $R^1$ radical hereinbefore, or an alkoxyalkyl radical having the formula $R^1O(CH_2)_z$, in which formulae $R^1$ and $z$ have the same significance as hereinbefore.

16 Claims, No Drawings

METHOD OF REDUCING ORGANIC COMPOUNDS BY MEANS OF SODIUM- ALUMINUM HYDRIDES

CROSS-REFERENCE TO RELATED APPLICATION

This application is a division of application Ser. No. 594,971, filed Nov. 10, 1966, which issued as a Pat. No. 3,652,662, entitled "Organically Substituted Sodium Aluminum Hydrides and Method of Making and Using the Same".

The present invention relates to a method of producing substituted aluminum hydrides, to novel substituted aluminum hydrides and to a method of carrying out reductions and a method of utilizing substituted aluminum hydrides as reducing agents and as catalysts.

More particularly, the present invention is concerned with a method of producing sodium aluminum hydrides which are substituted with organic groups, with novel sodium aluminum hydrides substituted with organic groups, and with a method of carrying out reductions and catalytically favored direct synthesis, utilizing the novel organically substituted aluminum hydrides of the present invention.

Certain organically substituted sodium aluminum hydrides, for instance sodium aluminum ethoxy hydride, methoxy hydride and aryloxy hydrides are known and used as specific reducing agents in organic chemistry. It is possible, for instance, by using these compounds as reducing agents to reduce aldehydes, ketones and organic acid esters and chlorides to alcohols, to reduce nitro-compounds to amines and nitriles to aldehydes. Furthermore, these compounds are useful as halogenating agents.

Various processes have been described for producing these compounds.

One of the difficulties encountered in producing these compounds and also in using the same is that they are only soluble in very few organic solvents, for instance in diethyl ether but not in solvents which are more easily available and less dangerous to handle. Thus, for instance, it is not possible to dissolve the above mentioned organically substituted sodium aluminum hydrides in benzene.

This limited solubility creates difficulties and dangers in the production as well as in the use of these known products.

Some other hydrides for instance decaborane are soluble in non-polar media, however, in such solution these hydrides do not possess any reducing properties.

It is therefore an object of the present invention to overcome the above mentioned difficulties and disadvantages.

It is a further object of the present invention to provide a method for producing organically substituted sodium aluminum hydrides which can be carried out in a simple and economical manner.

It is yet another object of the present invention to provide a method for producing organically substituted sodium aluminum hydrides which can be carried out in a non-polar media.

It is still a further object of the present invention to provide organically substituted sodium aluminum hydrides which are soluble in certain organic non-polar media such as benzene, toluene and the like.

It is still another object of the present invention to provide a method of carrying out reducing reactions, utilizing organically substituted sodium aluminum hydrides as the reducing agents, which reactions can be carried out in non-polar media.

It is an additional object of the present invention to provide a method for the direct synthesis of sodium aluminum hydrides, particularly sodium aluminum tetrahydride and trisodium aluminum, hexahydride.

Other objects and advantages of the present invention will become apparent from a further reading of the description and of the appended claims.

With the above and other objects in view, the present invention contemplates a method of producing organically substituted sodium aluminum hydrides of the general formula I $NaAlH_xZ_{4-x}$, wherein $x$ is an integral number between 1 and 3 inclusive and Z is selected from the group consisting of Q and Y, wherein Y is selected from the group consisting of methoxyl, ethoxyl and propoxyl, and wherein Q is an organic radical derived by splitting off an active hydrogen atom from a compound selected from the group consisting of:

1. tetrahydrofurfuryl alcohols,
2. tetrahydropyranyl alcohols,
3. ether alcohols of the type obtainable by alkylating one hydroxyl group in diols or two hydroxyl groups in triols.
4. polyether alcohols of the type obtainable by dehydration of ether alcohols and diols or by dehydration of tetrahydrofurfuryl alcohols and diols, or by dehydration tetrahydropyranyl of alcohols and diols,
5. the compounds of groups (1) – (4), wherein at least one oxygen atom is replaced by a sulphur atom,
6. an amino alcohol of the general formula $R''R'''N(CH_2)_zOH$, wherein $R''$ and $R'''$ are each selected from the group consisting of alkoxyalkyl of the formula $R'O(CH_2)_z$ and $R'$, wherein $R'$ is selected from the group consisting of alkyl with 1–4 carbon atoms and aryl with 6–8 carbon atoms, and wherein $z$ is an integral number between 2 and 4 inclusive, comprising the step of reacting at least one substance selected from the group consisting of $Na_3AlH_6$ and $NaAlH_4$ with a compound of the general formula $AlZ_3$, wherein Z has the same meaning as defined above.

The term "propoxyl" is meant to denote not only normal propoxyl but also isopropoxyl.

$Na_3AlH_6$ may be prepared for instance by the method described in Czechoslovak Pat. No. 117768.

Compounds of the general formula $AlZ_3$ and also of the general formula $NaZ$ which may be also used as a supplementary reactant as will be described in detail further hereinafter, may be prepared by the reaction of the respective alcohol with the metal, i.e, with sodium or aluminum, or with the respective hydride, i.e., sodium hydride or aluminum hydride. There is no difficulty involved in preparing the thioalkoxy, dialkylamino and alkylamino substituted derivatives. In the case of the preparation of the thioalcoholates of the type NaZ and $AlZ_3$, however, it is recommended to start from the more reactive hydrides NaH and $AlH_3$ instead of the metals. The reactions, generally, may be carried out in liquid media such as hydrocarbons, ethers (diethylether, monoglyme, which is 1,2- dimethoxyethane and, tetrahydrofurane) using an excess on the ZH compounds.

The thus formed NaZ compounds are insoluble in the reaction medium and thus will be formed as a suspension.

Prior to being used in the above described process of the present invention which may be carried out for instance as described in equations 7–13 and 15–19 hereinafter, the NaZ compounds must be separated from the suspension preferably by filtration and subsequent drying. The thus obtained dry product may be used directly as a starting material for the method of the present invention. It does not require any further purification. The impurities which might be present such as metallic sodium do not interfere with the reaction since these impurities are insoluble in the reaction medium, whereas the finished products obtained by the method of the present invention will be soluble in the respective reaction medium. However, if the compound of the type NaZ has been made by using NaH as starting material and therefore the thus produced NaZ may contain residual NaH it might be desirable in certain cases to increase in the method according to the present invention the amount of the sodium aluminum hydride and of $AlZ_3$ above the theoretically required amount.

The preparation of alcoholates, aminoalcoholates, and thioalcoholates of the type $AlQ_3$ is equally simple. Conventional methods may be used in the preparation of all derivatives, starting from the aluminum or aluminum S-Al and the respective alcohol, aminoalcohol or thioalcohol of the formula QH, the latter being easily removed from the product $AlQ_3$ when stripping off the solvent; subsequently, the product $AlQ_3$ is dried in vacuo. The above sodium aluminum hydrides, substituted according to this invention are all soluble in hydrocarbons and ethers; thus unaltered aluminum or aluminum hydride can be asily removed by filtration prior to the actual isolation of the final product. The thioalkoxy-derivatives, however, having a S-Al bond in their molecule, are distinguished by somewhat lower solubility.

Another very advantageous method of producing aluminum alcoholates and thioalcoholates of the type $AlQ_3$ is based on the following equilibrium reaction:

1. $Al(OCH_3)_3 + 3QH \rightarrow AlQ_3 + 3CH_3OH$
2. $Al(OR)_3 + 3QH \rightarrow AlQ_3 + 3ROH$ It is advisable to use an excess on QH and to carry out the reaction under simultaneous removal of $CH_3OH$ (or ROH), the boiling point of which must be lower than that of QH, which usually will be the case. The stripping off of the $CH_3OH$ (ROH) may be conveniently carried out by using a rectification column.

The starting aluminum alcoholates to carry out the reaction are easily accessible in a pure state, even on an industrial scale. To start from $Al(OCH_3)_3$ seems to be most advantageous since the same is insoluble, e.g., in hydrocarbons, thus facilitating the separation of any unaltered portion thereof from the reaction mixture. The product $AlQ_3$ may be isolated by simply stripping off the solvent and the excess of QH.

The starting compound of the type $NaZ.AlZ_3$ may be prepared by the reactions accounted for as follows:

3. $Na + Al + 4QH \rightarrow NaAlQ_4 + 2H_2$
4. $NaH + AlH_3 + 4QH \rightarrow NaAlQ_4 + 4H_2$
5. $NaAlH_4 + 4QH \rightarrow NaAlQ_4 + 4H_2$
b. $NaAl(OCH_3)_4 + 4QH \rightarrow NaAlQ_4 + 4CH_3OH$ The complex alcoholates of the type $NaZ.AlZ_3$ are generally easily soluble in ethers and the $NaQ.AlQ_3$alcoholates even in aromatic hydrocarbons. Thus, they may be easily prepared according to the equations given above under the same conditions as when starting from simple alcoholates of the type $NaZ + AlZ_3$.

The method of the present invention may be carried out in accordance with the following equations:

7. $Na_3AlH_6 + 3NaZ + 5AlZ_3 \rightarrow 6NaAlHZ_3$
8. $Na_3AlH_6 + 2AlZ_3 \rightarrow 3NaAlH_2Z_2$
9. $3Na_3AlH_6 + 2AlZ_3 + AlCl_3 \rightarrow 6NaAlH_3Z + 3NaCl$
10. $NaAlH_4 + 3AlZ_3 + 3NaZ \rightarrow 4NaAlHZ_3$
11. $NaAlH_4 + AlZ_3 + NaZ \rightarrow 2NaAlH_2Z_2$
12. $NaAlH_4 + 2NaH + 2AlZ_3 \rightarrow 3NaAlH_2Z_2$
13. $3NaAlH_4 + AlZ_3 + NaZ \rightarrow 4NaAlH_3Z$ In a similar manner complex compounds of the general formula $NaZ.AlZ_3$ may be used instead of $AlZ_3$, for instance in accordance with the equations 15–19 further hereinafter.

It is generally known that sodium alcoholates and aluminum alcoholates react to yield complex alcholates according to the following equation:

14. $NaOX + Al(OX)_3 \rightarrow NaOX.Al(OX)_3$ 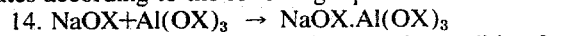

wherein X is an alkyl or an aryl. The only condition for carrying out this reaction is that of solubility. $Al(OX)_3$ and the product NaAl $NaAl(OX)_4$ must be soluble in the solvents used. The alcoholates of the type $AlQ_3$ and $NaQ.AlQ_3$are generally more easily soluble in ethers and in aromatic hydrocarbons than the alcoholates of the type $Na(OX).Al(OX)_3$. wherein X is the same as mentioned hereinbefore and they always result as an intermedial product of the reactions 7 to 13. If the complex alcoholates of the type $NaZ.Alz_3$ are used as the starting product according to our invention the respective reactions are accounted for by the following equations:

15. $Na_3AlH_6 + 3[NaZ.AlZ_3] + 2AlZ_3 \rightarrow 6NaAlHZ_3$
16. $NaAlH_4 + 3[NaZ.AlZ_3] \rightarrow 4NaAlHZ_3$
17. $NaAlH_4 + NaZ.AlZ_3 \rightarrow 2NaAlH_2Z_2$
18. $NaAlH_4 + 3[NaZ.AlZ_3] + 2NaH + 2AlZ_3 \rightarrow 6NaAlHZ_3$
19. $3NaAlH_4 + NaZ.AlZ_3 \rightarrow 4NaAlH_3Z$ The liquid reaction medium on which the above described reactions of the present invention are carried out is preferably selected from the group consisting of hydrocarbons and ethers which at atmospheric pressure have a boiling point lower than the decomposition temperature of the substituted sodium aluminum hydride which is to be produced.

One suitable manner of carrying out the reaction is under reflux at substantially the boiling temperature of the reaction mixture. The liquid reaction medium preferred is benzene or toluene but, however, any of the liquid reaction media described above may be used.

The novel hydrides of the present invention are compounds of the general formula:

$NaAlH_xQ_{4-X}$ wherein $x$ stands for an integral number between 1 and 3 inclusive, and wherein Q is an organic radical derived by splitting off an active hydrogen atom from one of the following compounds in which $x$ has the same meaning as hereinbefore:

1. tetrahydrofurfuryl alcohols, so as to form, for instance,

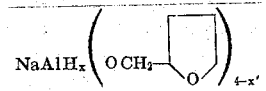

2. tetrahydropyranyl alcohols, so as to form, for instance,

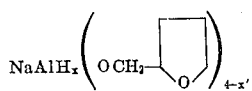

3. ether alcohols formed for instance by alkylating one hydroxyl group in diols so as to form, for instance, $NaAlH_x[O(CH_2)_zOR']_{4-x}$ or two hydroxyl groups in triols, so as to form, for instance,

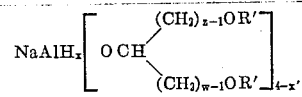

wherein R' is an organic radical selected from the group consisting of alkyl with 1–4 carbon atoms and aryl with 6–8 carbon atoms, and $z$ and $w$ are each an integral number between 2–4 inclusive, and $z$ and $w$ may be the same or different.

4. polyether alcohols obtained by dehydration of ether alcohols and diols, so as to form $NaAlH_x[O(CH_2)_zO(CH_2)_wOR']_{4-x}$, wherein R' has the same meaning as hereinbefore and $w$ and $z$ are each integral numbers between 2 and 4 inclusive.

5. polyether alcohols obtained by dehydration of tetrahydrofurfuryl alcohols and diols, so as to form

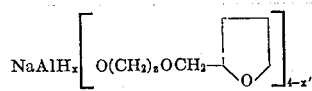

wherein $z$ has the same meaning as hereinbefore.

6. polyether alcohols obtained by the dehydration of tetrahydropyranyl alcohols and diols, so as to form

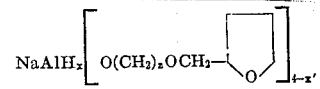

wherein $z$ has the same meaning as hereinbefore.

7. any of the compounds described in numbered paragraphs 1–6 hereinbefore, in which one or more or all oxygen atoms are replaced by sulphur atoms, so as to form $NaAlH_x[S(CH_2)_zSR]_{4-x}$, or $NaAlH_x[S(CH_2)_zOR]_{4-x}$, or $NaAlH_x[O(CH_2)_zSR]_{4-x}$, wherein R is alkoxyalkyl of the formula $R'O(CH_2)_z$, or R', and wherein R' has the same meaning as hereinbefore.

8. an amino alcohol of the general formula $R''R'''N(CH_2)_zOH$, wherein R'' and R''' each have the same meaning as R and R'' and R''' may be identical or different, so as to form $NaAlH_x[O(CH_2)_zNR''R''']_{4-x}$, wherein $z$, R'' and R''' have the same meaning as hereinbefore.

The sulphur-containing, compounds including the organic radical described as Q hereinbefore may be such that all oxygen atoms are replaced by sulphur or may contain sulphur as well as oxygen atoms.

Groups of compounds which fall within the scope of the present invention include:

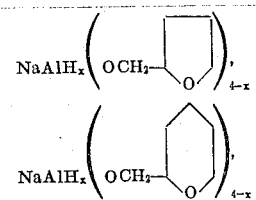

$NaAlH_x(OCH_2CH_2OR')_{4-x}$,
$NaAlH_x(OCH_2CH_2CH_2OR')_{4-x}$,
$NaAlH_x[O(CH_2)_zO(CH_2)_wOR']_{4-x}$,

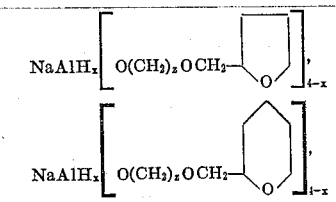

$NaAlH_x[S(CH_2)_zSR'']_{4-x}$,
$NaAlH_x[S(CH_2)_zOR'']_{4-x}$,
$NaAlH_x[O(CH_2)_zSR'']_{4-x}$,
$NaAlH_x[O(CH_2)_zNR''R''']_{4-x}$,
wherein $w$ is an integral number between 2 and 4 inclusive and $x$, $z$, R', R'' and R''' have the same meaning as described hereinbefore.

More specifically, but not by way of limitation, the compounds of the present invention include:
$NaAlH_3[O(CH_2)_2OCH_3]$,
$NaAlH_3[O(CH_2)_2OC_2H_5]$,
$NaAlH_3[O(CH_2)_3OCH_3]$,
$NaAlH_3[O(CH_2)_3OC_2H_5]$,

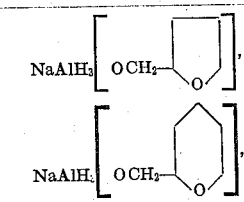

$NaAlH_3[O(CH_2)_2N(CH_3)_2]$,
$NaAlH_3[O(CH_2)_2N(C_2H_5)_2]$,
$NaAlH_3[O(CH_2)_2N(CH_2CH_2OCH_3)_2]$,

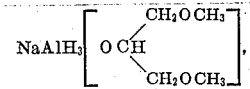

$NaAlH_3[O(CH_2)_2O(CH_2)_2OCH_3]$,
$NaAlH_2[O(CH_2)_2OCH_3]_2$,
$NaAlH_2[O(CH_2)_2OC_2H_5]_2$,
$NaAlH_2[O(CH_2)_3OCH_3]_2$,
$NaAlH_2[O(CH_2)_3OC_2H_5]_2$,

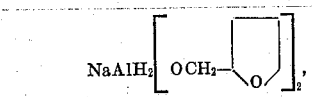

$NaAlH_2[O(CH_2)_2N(CH_3)_2]_2$, $NaAlH_2[O(CH_2)_2N(C_2H_5)_2]_2$,
$NaAlH_2[O(CH_2)_2N(CH_2CH_2OCH_3)_2]_2$,

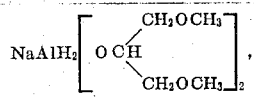

$NaAlH_2[O(CH_2)_2O(CH_2)_2OCH_3]_2$,
$NaAlH[O(CH_2)_2OCH_3]_3$,
$NaAlH[O(CH_2)_2OC_2H_5]_3$,
$NaAlH[O(CH_2)_3OCH_3]_3$, $NaAlH[O(CH_2)_3OC_2H_5]_3$,

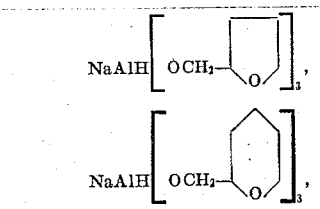

$NaAlH[O(CH_2)_2N(CH_3)_2]_3$,
$NaAlH[O(CH_2)_2N(C_2H_5)_2]_3$,
$NaAlH[O(CH_2)_2N(CH_2CH_2OCH_3)_2]_3$,

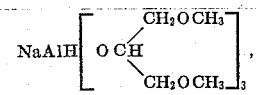

$NaAlH[O(CH_2)_2O(CH_2)OCH_3]_3$.

It is also within the scope of the present invention to provide a method of producing at least one sodium aluminum hydride selected from the group consisting of $NaAlH_4$ and $Na_3AlH_6$, comprising the step of reacting metallic sodium and metallic aluminum with hydrogen preferably at an elevated hydrogen gas pressure and at an elevated temperature in the presence of a substituted sodium aluminum hydride as defined herein before.

According to a further variation, the present invention is also concerned with carrying out reducing and dehalogenizing reactions by reducing reducible organic compound in the presence of an organically substituted sodium aluminum hydride as described herein. The organic compound may for instance be an aldehyde, ketone, ester, carboxylic acid, halide of a carboxylic acid, dialkyl amides, diaryl amides and aromatic nitro compound, or a halide which may be an organic or inorganic mono- or polyhalide including substituted halides such as silicon alkyl or aryl halides for instance of the general formula $R_{4-x}SiX_x$, wherein R is alkyl or aryl and X is a halogen.

The substituted sodium aluminum hydrides of the present invention may thus be used as reducing agents soluble in non-polar media and as catalysts for the direct synthesis of complex sodium aluminum hydrides from free elements, i.e., from sodium, aluminum and hydrogen.

These substituted complex sodium aluminum hydrides will reduce in non-polar media, e.g., in benzene, the derivatives of organic acids, ketones and aldehydes to alcohols in the same way and to the same extent as it would be possible with non-substituted complex aluminum hydrides in ethers. In contradistinction to the properties of the known complex aluminum hydrides, they will even dehalogenate the alkyl and aryl halides, and they will reduce the nitro derivatives to azo-compounds. All the aforementioned reactions will proceed in ethers as well as in non-polar media.

The following examples are given as illustrative without, however, limiting the invention to the specific details of the examples.

EXAMPLE I

An apparatus as described hereinafter in Example II was charged with 2.1 g of an 80% solution of $Na_3AlH_6$ (0.0164 mol) and 50 ml of benzene. The mixture was refluxed under dropwise addition of 8.27 g of Al-$(OCH_2CH_2OCH_3)_3$ [0.0328 mol]dissolved in 10 ml of benzene. The reaction mixture was kept boiling under stirring for an additonal 30 minutes. Upon subsequent filtration and evaporation of the solvent, 9.36 gram of $NaAlH_2(OCH_2CH_2OCH_3)_2$ was obtained; i.e., 94.1% of the theory.

The starting compound $Al[OCH_2CH_2OCH_3]_3$ was prepared by the following reaction: $Al(OCH_3)_3+3C-H_3OCH_2CH_2OH \rightarrow Al[OCH_2CH_2OCH_3]_3+3CH_3OH$. the above reaction was carried out with a 160% excess of $CH_3OCH_2CH_2OH$. (Instead of using an excess of $CH_3OCH_2CH_2OH$, the theoretically required amount may be used and the excess of this compound replaced with another solvent, preferably benzene or toluene.) The methyl alcohol evolved was distilled off from the reaction mixture during the reaction, using a rectification column. Subsequently to stripping off the methyl alcohol, the excess of $CH_3OCH_2CH_2OH$ was stripped off under vacuum. The product of the reaction is a liquid highly viscous compound of the formula Al-$(OCH_2CH_2OCH_3)_3$, intermiscible with benzene, toluene, and ethers in any ratio.

EXAMPLE II

Into a three-necked round-bottomed flask of 100 ml volume, provided with a stirrer, a reflux water-condenser and dropping funnel, was charged 1.7 g of $Na_3AlH_6$ of 85% purity (the remaining 15% consisting of aluminum and silicon), and 35 ml of tetrahydrofurane was added. The mixture was heated to boiling and a solution of 8.26 g $Al[O.CH_2CH_2N(CH_3)_2]_3$ in 1.5 ml tetrahydrofuran was added dropwise under stirring. The heating was discontinued after 45 minutes and the mixture was cooled to 15°C. Subsequent to filtration, the tetrahydrofuran was stripped off from the filtrate, and the thus obtained residue was dried at 100°C. at a pressure of 0.1 mm Hg; 9.1 g of a compound of the formula $NaAlH_2[O.CH_2CH_2N(CH_3)_2]_2$ was obtained, i.e., 93.5% of the theory according to equation 8. The $(CH_3)_2NCH_2CH_2OH$ required for preparation of Al-$[OCH_2CH_2N(CH_3)_2]_3$ was prepared by a reaction which is well known in the methylation of primary amines to convert the latter into tertiary amines, starting with $H_2NCH_2CH_2OH$, formaldehyde and formic acid. The starting $Al[OCH_2CH_2N(CH_3)_2]_3$ was prepared from aluminum methylate in a manner similar to that described in Example I, with respect to the preparation of $Al(OCH_2CH_2OCH_3)_3$.

EXAMPLE III

Into a 250 ml flask provided with a reflux condenser, a stirrer, and a dropping funnel, 7.35 g of $Na_3AlH_6$ and 11.86 g of $Al[OCH_2CH_2N(CH_3)_2]_3$ was charged and 85 ml tetrahydrofuran added. The mixture was heated to boiling under reflux, and a solution of 2.72 g $AlCl_3$ in 25 ml tetrahydrofuran added dropwise within a period of 30 minutes. Subsequently, the mixture was heated under reflux for an additional 45 minutes, cooled to 20°C. and filtered. The tetrahydrofuran was stripped off from the filtrate and the distillation residue was dried at 100°C. and 0.1 mm Hg; 15.84 g of NaAlH$_3$OCH$_2$CH$_2$N(CH$_3$)$_2$ was obtained, i.e., 91.6% of the theoretical yield.

EXAMPLE IV

Into a 2.5 l pressure vessel, 46 g of sodium (2 moles), 32.9 g of aluminum powder of 82% purity (the balance up to 100% consisting of aluminum oxide), 50.5 g of NaAlH$_2$(OCH$_2$CH$_2$OCH$_3$)$_2$[0.25 mol], and 500 ml of benzene was added and a stirring bar inserted into the pressure vessel for stirring of the reaction mixture. Hydrogen was fed into the vessel to establish a pressure of 100 atmospheres. The reaction was then carried out at a temperature of 170°C. for a period of 3 hours. The reaction mixture was filtered and the solid residue extracted with benzene; 55.4 g of solid Na$_3$AlH$_6$ was obtained of 88.5% purity, i.e., 96.1% of the theory. The benzene filtrete contained dissolved sodium aluminum alkoxyhydrides which were used as catalyst in the following synthesis.

The direct synthesis of both sodium aluminum hydrides NaAlH$_4$ and Na$_3$AlH$_6$ proceeds similarly even if other compounds of the type NaAlH$_x$Q$_{4-x}$, e.g., NaAlH[O(CH$_2$)$_2$OCH$_3$]$_3$, NaAlH$_3$[O(CH$_2$)$_2$O(CH$_2$)$_2$OCH$_3$],

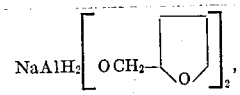

or NaAlH$_2$[O(CH$_2$)$_2$N(CH$_3$)$_2$]$_2$ are used as a catalyst; the sulphur compounds, however, being less suitable than the other compounds of the formula NaAlH$_x$Q$_{4-x}$. The pressure of hydrogen applied may be in a very broad range from 2 to 200 atmospheres. At pressures lower than 2 atmospheres, however, the reaction is too slow; increasing the pressure above 200 atmospheres does not influence the reaction rate substantially, thus a further increasing of the pressure above 200 atmospheres is not practical. The quantity of the catalyst applied can vary in the range of 0.5 to 100% in respect to the amount of sodium and aluminum used. In the specific Example IV, about 50% of the catalyst was used.

Smaller amounts of the catalyst below 0.5% result in decreasing of the reaction rate.

Using a greater amount of catalysts is of no inconvenience as the catalyst may easily be recycled.

It is advisable to grind the reaction mixture thoroughly prior to the actual synthesis.

EXAMPLE V

Into a 1-liter three-necked vessel, provided with a stirrer, a water cooler, and dropping funnel were charged: 2.75 g NaAlH$_4$[98.2%], 200 ml benzene, and 8 g

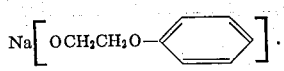

The reaction mixture was refluxed under dropwise addition of a solution of 21.9 g

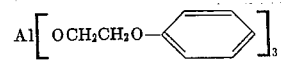

in 50 ml of benzene, within a period of 30 minutes, and the reaction mixture was refluxed for an additional 4 hours. Subsequently to cooling to 15°C. and to filtration, the filtration cake was washed with benzene. Benzene was stripped off from the collected filtrates and the distillation residue was dried at 100°C. and 0.1 mm Hg. The yield was 32 g of

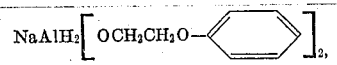

which corresponds to 98.16% of the theory.

The starting compound of the formula

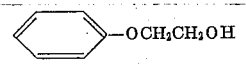

was prepared in toluene by the well known reaction accounted for by the following equations

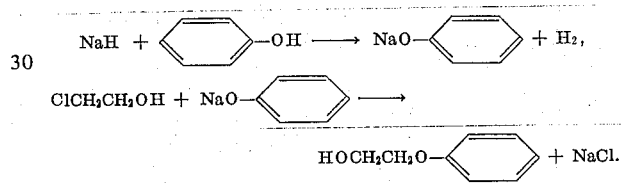

The starting

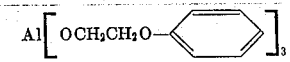

was prepared from aluminum methylate by reactions similar to those described in Example I. The alcoholate

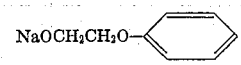

was prepared in a refluxing mixture of toluene, sodium hydride and

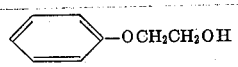

in a 20% excess. The toluene and the excessive ether alcohol were stripped off in vacuo and the remaining portions of the said compounds were distilled off at 0.05 mm Hg and 160°C.

EXAMPLE VI

The same apparatus as in Example V was charged with 5.6 g Na$_3$AlH$_6$ [91.1%], 500 ml benzene, and 26.1 g

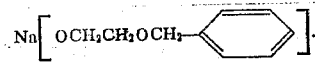

The reaction mixture was refluxed under dropwise addition of a solution of 120 g

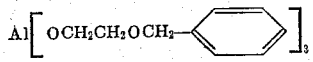

in 200 ml benzene within a period of 30 minutes. The reaction mixture upon treatment as described in Example V yielded 147.2 g

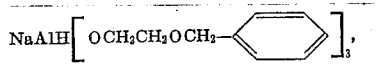

i.e., 97.36% of the theory.
To prepare

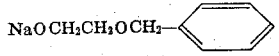

and

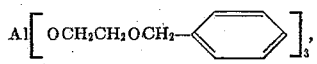

use was made of the same methods as described in Example V.

EXAMPLE VII

The same apparatus as in Example V was charged with 2.75 g NaAlH₄ [98.2%], 2.5 g NaH [96.0%] and 150 ml toluene. The reaction mixture was refluxed uner dropwise addition of a solution of 29.4 g Al(OCH₂CH₂CH₂OCH₃)₃ in 50 ml toluene within a period of 45 minutes. Upon treatment of the reaction mixture in the manner described in Example V, 34.0 g of NaAlH₂(OCH₂CH₂CH₂OCH₃)₂ was obtained, corresponding to 98.57% of theoretical yield.

The necessary CH₃OCH₂CH₂Ch₂OH required for preparation of Al(OCH₂CH₂Ch₂OCH₃)₃ was prepared by the methylation of one hydroxyl group in 1,3-propanediol, using sodium hydride and (CH₃O)₂SO₂. The latter reaction was carried out in boiling toluene. The starting Al[OCH₂CH₂CH₂OCH₃]₃ was prepared from aluminum methylate in the same manner as described in Example I.

EXAMPLE VIII

Into the same apparatus as described in Example V, were charged: 2.75 g of NaAlH₄ [98.2%], 26.1 g of

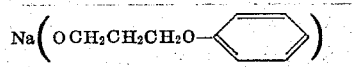

and 500 ml of benzene. The reaction mixture was refluxed under simultaneous dropwise addition of a solution of 72 g

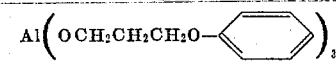

in 150 ml benzene, within a period of 45 minutes. Treatment of the reaction mixture in a manner similar to that described in Example V gave 99.51 g

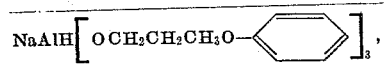

i.e., 98.72% of the theory.
In the preparation of the starting compound use was made of the same method as described in Example V.

EXAMPLE IX

The apparatus described in Example V was charged with 2.75 g NaAlH₄ [98.2%], 2.07

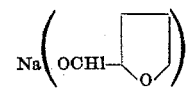

and 100 ml tetrahydofuran. The reaction mixture was refluxed under dropwise addition of a solution of 5.5 g

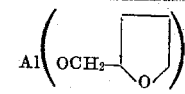

in 20 ml tetrahydofuran within a period of 45 minutes. Upon further proceeding as described in Example V, 9.85 g of

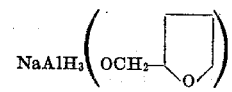

was obtained, i.e., 96.01% of the theoretical yield.
The two starting alcoholates of this example were prepared from

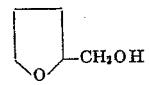

by the method given in Example V for

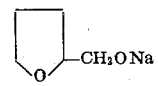

and in Example I for

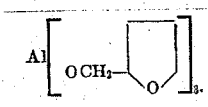

EXAMPLE X

The same apparatus as in Example V was charged with 5.6 g Na₃AlH₆ [91.1%] and 250 ml benzene. The reaction mixture was refluxed under dropwise addition of a solution of 38.4 g Al(OCH₂CH₂OCH₂CH₂OCH₃)₃ in 80 ml benzene. Further treating of the reaction mixture as described in Example V yielded 42 g NaAlH- $_2(OCH_2CH_2OCH_2CH_2OCH_3)_2$, which corresponds to 96.56% of the theory.

The alcoholate $Al(OCH_2CH_2OCH_2CH_2OCH_3)_3$ was prepared from $CH_3OCH_2CH_2OCH_2CH_2OH$ by the method described in Example I.

EXAMPLE XI

Into the same apparatus as used according to Example V, were charged: 2.75 g $NaAlH_4$ and 100 ml benzene. The reaction mixturre was refluxed under dropwise addition of a solution of 41.5 g

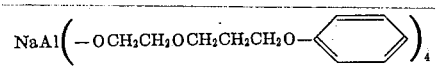

in 150 ml benzene. The same treatment of the reaction mixture as in Example V gave 43.2 g

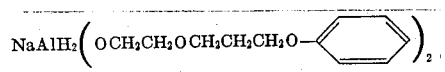

which is 97.74% of the theory.
The

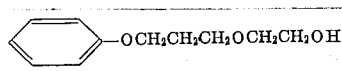

required for preparation of

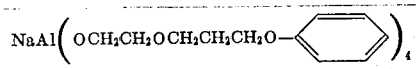

was prepared in the following manner: The sodium phenolate was alkylated in boiling toluene with $HOCH_2CH_2CH_2Cl$;

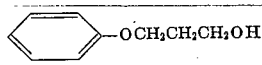

resulting from the reaction was isolated and converted by reaction with sodium hydride in boiling toluene into its alcoholate and the latter was alkylated with $HOCH_2CH_2Cl$, giving a compound of the formula

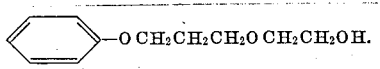

The starting complex alcoholate was prepared in the apparatus described in Example V with the following equation:

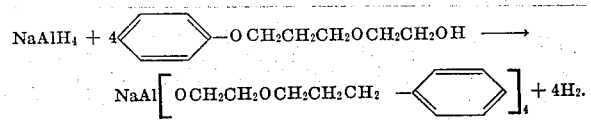

The alcohol was added dropwise to a 5% solution of sodium aluminum tetrahydride in tetrahydrofurane in the stoichiometrically required amount.

The reaction proceeded quantitatively under considerable evolution of heat and of hydrogen. After the evolution of hydrogen had stopped, tetrahydofuran was distilled off and the product stripped off from the residues of tetrahydofuran at 0.1 mm Hg and 100°C.

EXAMPLE XII

The same apparatus as described in Example V was charged with 5.6 g $Na_3AlH_6(91.1\%)$, 27.6 g $Na[O(CH_2)_2O(CH_2)_4-OCH_2CH_3]$ and 600 ml benzene. The reaction mixture was refluxed under dropwise addition of a solution of 127.6 g $Al[O(CH_2)_2O(CH_2)_4OCH_2CH_3]_3$ in 250 ml within 45 minutes. Upon treatment of the reaction mixture as described in Example V, 154.0 g of $NaAlH[O(CH_2)_2O(CH_2)_4OCH_2CH_3]_3$ was obtained, which corresponds to 96.13% of the theoretical yield.

The alcohol of the formula $C_2H_5O(CH_2)_4O(CH_2)_2OH$ that was required for preparation of the starting alcoholate was prepared from 1,4-butanediol by converting one of the hydroxyl groups into alcoholate by reaction with sodium hydride in boiling toluene and subsequent alkylation with $C_2H_5Br$. The product obtained, i.e., $C_2H_5O(CH_2)_4OH$ was reconverted into the alcoholate form by reaction with sodium hydride in boiling toluene with $C_2H_5O(CH_2)_4ONa$ subsequently alkylated with $ClCH_2CH_2OH$, giving $C_2H_5O(CH_2)_4O(CH_2)_2OH$.

The starting alcoholate of the formula $Al[O(CH_2)_2O(CH_2)_4OC_2H_5]_3$ was prepared from aluminum methylate and $C_2H_5O(CH_2)_4O(CH_2)_2OH$ in the same manner as described in Example I. The compound of the formula $NaO(CH_2)_2O(CH_2)_4OC_2H_5$ was prepared by the reaction of sodium hydride with $C_2H_5O(CH_2)_4O(CH_2)_2OH$ in the same manner as described in Example V.

EXAMPLE XIII

The same apparatus as described in Example V was charged with 2.75 g of $NaAlH_4(98.2\%)$, 2.5 g NaH (96.0%), and 300 ml toluene. The reaction mixture was refluxed under dropwise addition of a solution of 46.25 g

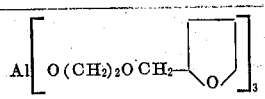

in 100 ml toluene. Upon treatment of the reaction mixture as described in Example V, 50 g of

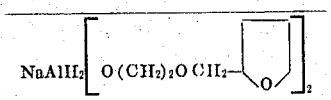

was obtained, i.e., 97.4% of the theory.
The

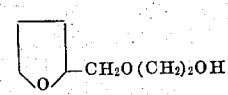

required for preparation of

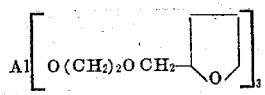

was prepared from

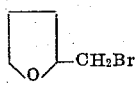

and NaOCH$_2$CH$_2$OH in boiling toluene by the method described in Example V. The starting

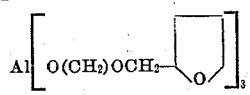

was prepared by the method described in Example I.

EXAMPLE XIV

The same apparatus as described in Example V was charged with 5.6 g Na$_3$AlH$_6$(91.1%) and 250 ml tetrahydrofurane. The reaction mixture was refluxed under dropwise addition of a solution of 22.3 g Al-[OC$_2$H$_4$N(C$_2$H$_5$)$_2$]$_3$ in 80 ml tetrahydofuran for a period of 45 minutes. Upon treatment of the reaction mixture as described in Example v, 26.71 g NaAlH$_2$-[OC$_2$H$_4$(C$_2$H$_5$)$_2$]$_2$ was obtained, i.e., 97.3% of the theory.

The starting alcoholate Al[OCH$_2$CH$_2$N(C$_2$H$_5$)$_2$]$_3$ was prepared from aluminum methylate and (C$_2$H$_5$)$_2$NCH$_2$CH$_2$OH by the method of Example I.

EXAMPLE XV

The same apparatus as described in Example V was charged with 5.6 g Na$_3$ALH$_6$(91.1%), 19.2 g Na-[O(CH$_2$)$_2$SC$_2$H$_5$] and 450 ml toluene. The reaction mixture was refluxed under dropwise addition of a solution of 85.5 g Al[O(CH$_2$)$_2$SC$_2$H$_5$]$_3$ in 150 ml toluene within a period of 40 minutes. Upon treatment of the reaction mixture as described in Example V, 106 g NaAlH-[O(CH$_2$)$_2$SC$_2$H$_5$]$_3$ was obtained, i.e., 96.54% of the theoretical yield.

For preparation of the starting reactants, first a thioether alcohol was prepared from HOCH$_2$CH$_2$Br and C$_2$H$_5$SNa in boiling xylene. The C$_2$H$_5$SCH$_2$CH$_2$OH obtained was converted into its sodium alcoholate NaOCH$_2$CH$_2$SC$_2$H$_5$ by the method of Example V and into its respective aluminate Al(OCH$_2$CH$_2$SC$_2$H$_5$)$_3$ by the method described in Example I.

EXAMPLE XVI

The same apparatus as described in Example V was charged with 5.6 g Na$_3$AlH$_6$(91.1%) and 350 ml benzene. The reaction mixture was refluxed under dropwise addition of a solution of 59.5 g

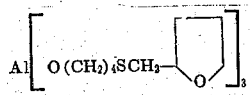

in 100 ml benzene within a period of 45 minutes. Upon treatment of the reaction mixture as described in Example V, 62 g

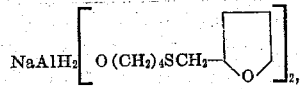

which corresponds to 96.14% of the theory were obtained.

In preparation of the starting material

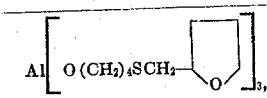

first the compound of the formula

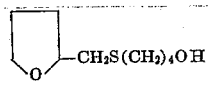

was prepared from

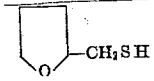

by conversion of the latter into

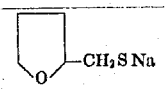

using sodium hydride in boiling toluene. The subsequent operation was alkylation of the mercaptide formed, i.e., of the mercaptide

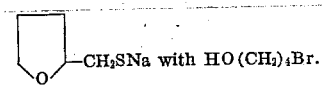

with HO(CH$_2$)$_4$Br. The thereby obtained product

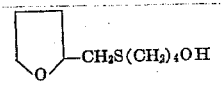

was converted into sodium alcoholate

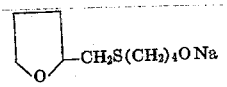

by the method of Example I.

EXAMPLE XVII

The same apparatus as described in Example V was charged with 5.6 g Na$_3$AlH$_6$(91.1%) and 250 ml toluene. Under refluxing the reaction mixture, 34.2 g Al[SC$_2$H$_4$OC$_2$H$_5$]$_3$ dissolved in 100 ml tetrahydrofuran was added dropwise over a period of 45 minutes. Upon treatment of the reaction mixture as described in Example V, 38.6 g NaAlH [SC$_2$H$_4$OC$_2$H$_5$]$_2$ was obtained, i.e., 98.22% of the theory.

The required mercaptan C$_2$H$_5$OC$_2$H$_4$SH was prepared by conventional synthetic methods from CH$_3$CH$_2$OCH$_2$CH$_2$Cl via a thiuronium salt. The aluminum mercaptide was prepared from the mercaptun obtained by the reaction with aluminum hydride in tetrahydofuran in a solution containing stoichiometric ratios of the reactants.

$AlH_3 + 3C_2H_5OC_2H_4SH \rightarrow Al[SC_2H_4OC_2H_5]_3 + 3H_2$

The solution obtained was subsequently analyzed and, upon adjustment of concentration, used directly in the above preparation of $NaAlH_2[SC_2H_4OC_2H_5]_2$.

EXAMPLE XVIII

The same apparatus as described in Example V was charged with 5.6 g $Na_3AlH_6$ (91.1%) and 250 ml benzene. Under refluxing of the reaction mixture 34.8 g $Al[SC_2H_4SCH_3]_3$ dissolved in 100 ml tetrahydofuran was added dropwise over a period of 45 minutes. Upon treatment of the reaction mixture as described in Example V, 38 g $NaAlH_2[SC_2H_4SCH_3]_2$ was obtained, i.e., 95.24% of the theory.

The mercaptan $CH_3SCH_2CH_2SH$ was prepared by conventional methylation of one SH group in $HSCH_2CH_2CH$. The $HSCH_2CH_2SH$ was converted to $HSCH_2CH_2SNa$ by the reaction with sodium hydride in boiling toluene and the mercaptide was subsequently treated under reflux with $(CH_3O)_2SO_2$, added in a molar ratio of 1:1. The aluminum mercaptide was prepared in the same way as described in Example XVII.

EXAMPLE XIX

The same apparatus as described in Example V was charged with 5.6 g $Na_3AlH_6$ (91.1%) and 150 ml tetrahydofuran. Under refluxing of the reaction mixture, 50.7 g $Al[SC_2H_4N+CH(C_2H_5)_2]_3$ dissolved in 250 ml tetrahydofuran was added dropwise over a period of 45 minutes. Upon treatment of the reaction mixture as described in Example V, 53.79 g of $NaAlH_2[SC_2H_4N(C_2H_5)_2]_2$ was obtained, i.e., 96.41% of the theory.

The amino mercaptan required was prepared from $(C_2H_5)_2NCH_2CH_2Cl$ via the thiuronium salt. The $(C_2H_4)_2NCH_2CH_2SH$ thus obtained was used in the preparation of $Al[SCH_2CH_2N(C_2H_5)_2]_3$ from aluminum hydride and tetrahydofuran in the same manner as described in Example XVII.

EXAMPLE XX

The same apparatus as described in Example V was charged with 5.6 g $Na_3AlH_6$ (91.1%), and 100 ml tetrahydofuran. The reaction mixture was refluxed under dropwise addition of a solution of 144.4 g $NaAl(SC_4H_8SC_2H_5)_4$ in 500 ml tetrahydofuran. Upon treatment of the reaction mixtures described in Example V, 145 g $NaAlH(SC_4H_8SC_2H_5)_3$ was obtained, i.e., 97.06% of the theory.

The necessary mercaptan was prepared from $BrCH_2CH_2CH_2CH_2Br$ by substitution of the bromine atoms with SH groups via thiuronium salt. The $SH(CH_2)_4SH$ thus obtained was converted into its sodium salt by reaction with sodium hydride in boiling toluene; the salt was alkylated with ethyl bromide also in toluene. The $C_2H_5S(CH_2)_4SH$ thus obtained was used in the preparation of the complex mercaptide starting from sodium aluminum tetrahydride. The reaction was carried out in tetrahydrofuran under reflux with theoretical amounts of the reactants according to the following equation:

$NaAlH_4 + 4C_2H_5S(CH_2)_4SH \rightarrow NaAl[S(CH_2)_4SC_2H_5]_4 + 4H_2$

The thus prepared solution was used directly (subsequent to analysis and adjustment of the concentration) in the preparation of the respective organically substituted sodium aluminum hydride of this example.

EXAMPLE XXI

The same apparatus as described in Example V was charged with 5.6 g $NaAlH_6$ (91.1%) and 100 ml tetrahydrofurane. The reaction mixture was refluxed under dropwise addition of a solution of 33.9 g $Al[SC_2H_4N(CH_3)_2]_3$ in 200 ml tetrahydrofurane within a period of 45 minutes. Upon treatment of of the reaction mixture as described in Example V, 37.8 g $NaAlH_2[SC_2H_4N(CH_3)_2]_2$ was obtained, i.e., 96.9% of the theoretical yield. The required aminomercaptan was prepared from $(CH_3)_2NCH_2CH_2Cl$, via the thiuronium salt. By the procedure described in the Example XIX, the compound $(CH_3)_2NC_2H_4SH$ was converted into the aluminum mercaptide $Al[SC_2H_4N(CH_3)_2]_3$.

EXAMPLE XXII

The same apparatus as described in Example V was charged with 63 g $NaAlH[OC_2H_4(CH_3)_2]_3$ and 250 ml benzene. The reaction mixture was refluxed under dropwise addition of 14 g benzoyl chloride for 30 minutes; subsequently, 50 ml benzene was added and the reaction mixture was refluxed for additional 2 hours and, subsequent to cooling, hydrolysis, and addition of HCl, 9.75 g of benzyl alcohol was isolated, i.e., 90.16% of the theory.

EXAMPLE XXIII

The same apparatus as described in Example V was charged with 55.2 g $NaAlH[OCH_2CH_2OCH_3]_3$ and 200 ml benzene. The reaction mixture was refluxed under addition of 15 g ethyl benzoate with 50 ml benzene for a period of 30 minutes. After an additional 2 hours of refluxing, the mixture was cooled, and hydrolysis and isolation yielded 8.76 g benzyl alcohol, i.e., 81% of the theory.

In a similar manner, the followikng compounds were reduced under substantially the same reaction conditions, and with the same solvents, molar concentrations and molar ratios of the reactants:

| Starting Compound | Product | Reaction time in hours | Yield |
|---|---|---|---|
| $(CH_3CO)_2O$ | $C_2H_5OH$ | 2 | 91.2% |
| $n\text{-}C_3H_7COOC_2H_5$ | $C_4H_9OH$ | 2 | 89.0% |
| $C_2H_5CON(CH_3)_2$ | $C_3H_7OH$ | 4 | 62.8% |

The procedure, however, is not limited to the use of the compounds given above. Under the same conditions any other compound of the type $NaAlH_xQ_{4-x}$ may be used as for example $NaAlH_2(OCH_2CH_2OCH_3)_2$,

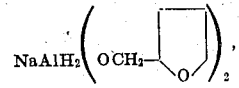

or $NaAlH_3[OCH_2OCH_2OCH_3]$.

To reduce 1 g mol of a compound containing one single carbonyl group (—CH—O or —CO—) into the respective alcohol the theoretically necessary amount of $NaAlH_{x4-x}$ is equal to 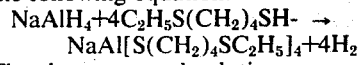 grammole of $NaAlH_xQ_{4-x}$; to reduce one gram mole of a compound containing one single carboxyl group in the molecule the amount necessary of the compound $NaAlH_xQ_{4-x}$ is equal to $\frac{2}{x}$ grammole of $NaAlH_2Q_{4-x}$.

EXAMPLE XXIV

In an apparatus as described in Example V, a suspension of 5.6 g trisodium aluminum hexahydride of 91.1% purity in 250 ml of benzene was prepared. The suspension was heated to boiling and a solution of 37.2 g

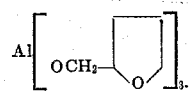

in 80 ml benzene was added dropwise over a period of 30 minutes. By the method of Example V, 39.8 g of

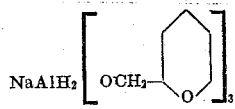

was obtained, which corresponds to 94% of the theory.

The starting

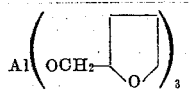

was prepared by reacting aluminum methylate with a solution of

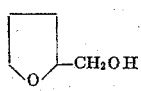

in toluene as a solvent, in which solution toluene and

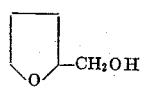

were present in a ratio of 1:1; the said

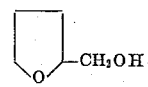

was used in an excess which corresponds to 150% of the theoretical amount needed. As described in Example I, methyl alcohol was stripped off from the reaction mixture in a rectification column; subsequently, toluene was stripped off at atmospheric pressure and, finally, the excess of

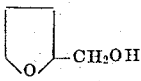

was stripped off in a partial vacuum at a temperature of up to 150°C. The product was a non-distillable, highly viscous matter, intermiscible with benzene, toluene, and ethers in any ratio.

EXAMPLE XXV

In the same apparatus as in Example V, a suspension of 5.6 g trisodium aluminum hexahydride of 91.1% purity in 250 ml benzene was prepared. The suspension was refluxed and a solution of 33.3 g Al-[OCH$_2$CH$_2$CH$_2$N(CH$_3$)$_2$]$_3$ in 80 ml benzene added during a period of 30 minutes. In the same manner as described in Example V, 36.7 g of NaAlH$_2$[OCH$_2$CH$_2$N(CH$_3$)$_2$]$_2$ was obtained.

To prepare the starting reactant first (CH$_3$)$_2$NCH$_2$CH$_2$CH$_2$OH had to be prepared from HOCH$_2$CH$_2$CH$_2$NH$_2$ by the conventional reaction with formaldehyde and formic acid; Al-[OCH$_2$CH$_2$CH$_2$N(CH$_3$)$_2$]$_3$ was then prepared from (CH$_3$)$_2$NCH$_2$CH$_2$CH$_2$OH in the same manner as described in Example XXIV. The former compound is a highly viscous non-distillable liquid, intermiscible with benzene, toluene and ethers in any ratio.

EXAMPLE XXVI

In the apparatus described in Example V, a suspension of 5.6 g trisodium aluminum hexahydride of 91.1% purity in 250 ml of benzene was prepared. The suspension was refluxed and a solution of 55.5 g Al[(OCH$_2$CH$_2$N(CH$_2$OCH$_3$)$_2$]$_3$ in 80 ml benzene was added dropwise over a period of 30 minutes. In the same manner as described in Example V, 59.4 g of NaAlH$_2$[OCH$_2$CH$_2$N(CH$_2$CH$_2$OCH$_3$)$_2$]$_2$ was obtained, i.e., 94.7% of the theory.

To prepare the starting reactant, first (CH$_3$OCH$_2$CH$_2$)$_2$NCH$_2$CH$_2$OH had to be prepared according to the following equations:

N(CH$_2$CH$_2$OH)$_3$+NaH → NaOCH$_2$CH$_2$N(CH$_2$CH$_2$OH)$_2$+NaH+H$_2$

NaOCH$_2$CH$_2$N(CH$_2$CH$_2$OH)$_2$+NaH+2(CH$_3$O)$_2$SO$_2$ →

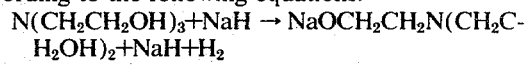

(CH$_3$OCH$_2$CH$_2$)$_2$NCH$_2$CH$_2$OH+H$_2$+2CH$_3$OSO$_2$ONa

To a refluxing suspension of sodium hydride in xylene (200 ml of xylene per 1 gram mol sodium hydride), Na(CH$_2$CH$_2$OH)$_2$ was added dropwise under stirring, and heating was prolonged until evolution of hydrogen had substantially stopped. Subsequently, (CH$_3$O)$_2$SO$_2$ was added under the same conditions, and the refluxing was resumed and continued until the evolution of hydrogen terminated. The mixture was allowed to cool and 100 ml of a 60% water solution of potassium hydroxide added per one gram mol of (CH$_3$O)$_2$SO$_2$ used. Then, the reaction mixture was filtered, the solid phase washed with xylene and from the xylene solutions HOCH$_2$CH$_2$N-(CH$_2$CH$_2$OCH$_3$)$_2$ was extracted with water, neutralized and slightly acidified with hydrochloric acid. The hydrochloride obtained was isolated by evaporation of water in vacuo, and the base was set free by addition of a 70% water solution of potassium hydroxide which was added in a slight excess not higher than 10% over the theoretically required amount. The mixture was stirred with diethyl ether and the precipitated potassium chloride was filtered off. The product (CH$_3$OCH$_2$CH$_2$)$_2$NCH$_2$CH$_2$OH was obtained from the ethereal solution by distillation and converted into its aluminate in the same manner as described in Examples I and XXIV.

EXAMPLE XXVII

In the apparatus described in Example V, a suspension of 5.6 g of Na$_3$AlH$_6$ of 91.1% purity was prepared in 250 ml benzene. The suspension was refluxed, and a solution of 72.3 g Al[OCH$_2$CH$_2$N(CH$_2$CH$_2$CH$_2$CH$_2$OCH$_3$)$_2$]$_3$ in 120 ml benzene added dropwise over a period of 30 minutes. In the same way as described in Example V, 72.1 g of NaAlH- $_2$[OCH$_2$CH$_2$N-(CH$_2$CH$_2$CH$_2$CH$_2$OCH$_3$)$_2$]$_2$ was obtained which corresponds to 93.2% of the theory.

The starting amino alcohol was prepared from HOCH$_2$CH$_2$NH$_2$ by alkylation of CH$_3$OCH$_2$CH$_2$Ch$_2$CH$_2$Cl. The latter compound was prepared by methylation of one hydroxyl group in 1,4-butane diol and by subsequent conversion of the second hydroxyl group into chloride by reaction with thionyl chloride. The necessary [(CH$_3$OCh$_2$CH$_2$CH$_2$CH$_2$)$_2$NCH$_2$CH$_2$O]$_3$Al was prepared in the manner described in Examples I and XXIV.

EXAMPLE XXVIII

In the apparatus described in Example V, a suspension of 5.6 g of trisodium aluminum hexahydride (0.05 mol) of 91.1% purity was prepared in 250 ml benzene. The suspension was refluxed and a solution of 38.4 g of Al[OCH(CH$_2$OCH$_3$)$_2$]$_3$ in 80 ml benzene was added over a period of 30 minutes. In the same manner as described in Example V, 55.6 g of NaAlH$_2$[OCH(CH$_2$OCH$_3$)$_2$]$_2$ was obtained, which corresponds to 95% of the theory.

The starting (CH$_3$OCH$_2$)$_2$CHOH was prepared from glycerol by methylation of two hydroxyl groups by reaction with sodium hydride and (CH$_3$O)$_2$SO$_2$ in a similar manner as described in Example XXVI. The ether alcohol obtained was used in the reaction with aluminum methoxide to prepare the starting Al[OCH(CH$_2$OCH$_3$)$_2$]$_3$ in the manner described in Example V.

EXAMPLE XXIX

In the apparatus described in Example V, a suspension was prepared of 5.6 trisodium aluminum hexahydride of a 91.9% purity in 200 ml tetrahydofuran. Under the conditions described in Example V, a solution of 20.4 g of (n-C$_3$H$_7$O)$_3$Al in 200 ml tetrahydofuran was added. Identical procedure as described in Example V afforded 24.1 g of NaAlH$_2$[O(n-C$_3$H$_7$)]$_2$, i.e., 94.3% of the theory.

EXAMPLES XXX to XL

In the apparatus described in Example v, and under the same conditions as described therein, further compounds of the formula NaAlH-$_3$ were synthetized according to the equation 20. NaAlH$_4$+3NaQ+3AlQ$_3$ → 4NaAlHQ$_3$ wherein the different radicals Q are defined in the Table 1 hereinafter.

In the apparatus described in Example V, a suspension was prepared of 2.75 g of sodium aluminum tetrahydride (0.05 mol) of a 98.2% purity and of 0.15 mol alcoholate of the type NaQ wherein Q again has the several meanings listed in the Table hereinafter. The reaction medium was 200 ml benzene. The reaction mixture was refluxed at ambient pressure and a solution of 1.15 mol of AlQ$_3$ in 100 ml benzene was added dropwise within a period of 30 minutes. The reaction mixture was refluxed for an additional 4 hours. Upon cooling to 15°C., the clear solution was filtered off and the solid residue containing mostly starting materials and impurities was washed with benzene stripped off from the filtrate. From the clear solution obtained benzene was distilled off and the collected product was dried in vacuo at 100°C. and 0.1 mm Hg.

The yields in gram and percent obtained with respect to the different specific reactants of Examples XXX to XL are also indicated in Table 1.

TABLE 1

| Example | Starting compounds | | | | Product, NaAlHQ$_3$ in g. | Yield, percent |
|---|---|---|---|---|---|---|
| | NaAlH$_4$ in g. | Q | NaQ in g. | AlQ$_3$ in g. | | |
| XXX | 2.75 | CH$_3$O(CH$_2$)$_2$O— | 14.7 | 37.8 | 52.1 | 96.5 |
| XXXI | 2.75 | C$_2$H$_5$O(CH$_2$)$_3$O— | 16.8 | 44.1 | 59.8 | 94.1 |
| XXXII | 2.75 | CH$_3$O(CH$_2$)$_3$O— | 16.8 | 44.1 | 60.4 | 95.0 |
| XXXIII | 2.75 | C$_2$H$_5$O(CH$_2$)$_3$O— | 18.9 | 50.4 | 68.5 | 95.1 |
| XXXIV | 2.75 | ⟨O⟩—CH$_2$O— (furfuryl) | 18.6 | 49.5 | 67.6 | 95.6 |
| XXXV | 2.75 | ⟨O⟩—CH$_2$O— (tetrahydropyranyl) | 20.7 | 55.8 | 74.4 | 94.4 |
| XXXVI | 2.75 | (CH$_3$)$_2$N(CH$_2$)$_2$O— | 16.7 | 43.7 | 60.5 | 96.1 |
| XXXVII | 2.75 | (C$_2$H$_5$)$_2$N(CH$_2$)$_2$O— | 20.9 | 56.3 | 64.9 | 95.7 |
| XXXVIII | 2.75 | (CH$_3$OCH$_2$CH$_2$)$_2$N(CH$_2$)$_2$O— | 22.4 | 60.8 | 61.2 | 94.6 |
| XXXIX | 2.75 | (CH$_3$OCH$_2$)$_2$CHO— | 21.3 | 57.6 | 78.3 | 96.1 |
| XL | 2.75 | CH$_3$O(CH$_2$)$_2$O(CH$_2$)$_2$O— | 21.3 | 57.6 | 76.1 | 93.2 |

EXAMPLES XLI TO XLIII

In the apparatus described in Example V, and under the same conditions as described in Examples XXX to XL, further compounds of the formular NaAlH$_2$Q$_2$ were synthesized according to the equation:

21. Na$_3$AlH$_6$+2AlQ$_3$ → 3NaAlH$_2$Q$_2$ wherein the different radicals Q are defined in the Table 2 hereinafter.

The starting materials used were throughout all the Examples 5.6 g of Na$_3$AlH$_6$ [0.05 mol] of 91.1% purity in 250 ml benzene and 0.1 mol AlQ$_3$ in 100 ml benzene.

The yields in grams and percent obtained with respect to the different specific reactants of Examples XLI to XLIII are also indicated in Table 2.

As to the catalyst used and as to the amount of the latter applied conditions were maintained as described in Example IV. The optimum temperature range lies

TABLE 2

| Example | Starting compounds | | $AlQ_3$ in g. | Product $NaAlH_2Q_2$ in g. | Yield, percent |
|---|---|---|---|---|---|
| | $Na_3AlH_6$ in g. | Q | | | |
| XLI | 5.6 | $C_2H_5O(CH_2)_2O-$ | 29.4 | 32.7 | 94.7 |
| XLII | 5.6 | $C_2H_5O(CH_2)_3O-$ | 33.6 | 36.9 | 95.3 |
| XLIII | 5.6 | 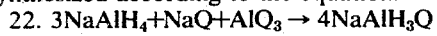$-CH_2O-$ | 33.0 | 35.4 | 93.0 |

EXAMPLES XLIV to LII

In the apparatus described in Example V, and under the same conditions as described in Examples V and XL, further compounds of the formula $NaAlH_3Q$ were synthesized according to the equation:

22. $3NaAlH_4 + NaQ + AlQ_3 \rightarrow 4NaAlH_3Q$

The starting suspension that was used throughout all the Examples contained 8.25 g of $NaAlH_4$ [0.15 mol] of 98.2% purity and 0.05 mol of NaQ in 150 ml of tetrahydrofurane. Throughout all the Examples a solution of 0.05 mol of $AlQ_3$ in 100 ml of tetrahydofuran was added. upon isolation as described in Example V, the compounds described in Table 3 below were obtained.

The yields in gram and percent obtained with respect to the different specific reactants of Examples XLIV to LII are also indicated in Table 3.

between 150°and 170°C. At temperatures below 150° the reaction is too slow or it does not proceed at all. At temperatures above 170°C trisodium aluminum hexahydride is obtained as a byproduct. It is also possible to work with stoichiometric amounts of sodium and aluminum; an excess of aluminum, however, is more advantageous (from 10 to 50%) so as to avoid excessive formation of trisodium aluminum hexahydride.

EXAMPLE LIV

In the apparatus described in Example V, a solution of 13.4 g of p—$CH_3C_6H_4NO_2$ in 100 ml benzene was added dropwise within a period of 30 minutes to a refluxing solution of 40.4 g of $NaAlH_2[O(CH_2)_2OCH_3]_2$ (0.2 mol) in 200 ml benzene. The mixture was refluxed for one additional hour and, subsequently to cooling to 20°C., 200 ml water was added and the

TABLE 3

| Example | Starting compounds | | NaQ in g. | $AlQ_3$ in g. | Product, $NaAlH_3Q$ in g. | Yield, percent |
|---|---|---|---|---|---|---|
| | $NaAlH_4$ in g. | Q | | | | |
| XLIV | 8.25 | $CH_3O(CH_2)_2O-$ | 4.9 | 12.6 | 25.1 | 98.1 |
| XLV | 8.25 | $C_2H_5O(CH_2)_2O-$ | 5.6 | 14.7 | 27.1 | 95.4 |
| XLVI | 8.25 | $CH_3O(CH_2)_3O-$ | 5.6 | 14.7 | 26.8 | 94.2 |
| XLVII | 8.25 | $C_2H_5O(CH_2)_3O-$ | 5.2 | 16.8 | 29.0 | 93.0 |
| XLVIII | 8.25 | 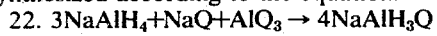$-CH_2O-$ | 6.9 | 18.6 | 31.9 | 95.1 |
| XLIX | 8.25 | $(C_2H_5)_2N(CH_2)_2O-$ | 6.9 | 18.8 | 32.4 | 95.9 |
| L | 8.25 | $(CH_3OCH_2CH_2)_2N(CH_2)_2O-$ | 7.5 | 20.2 | 34.0 | 95.1 |
| LI | 8.25 | $(CH_3OCH_2)_2CHO-$ | 7.1 | 19.2 | 33.0 | 96.0 |
| LII | 8.25 | $(CH_3OCH_2)_2O(CH_2)_2O-$ | 7.1 | 19.2 | 32.3 | 93.8 |

EXAMPLE LIII

Into a pressure vessel of 2.5 l volume were charged 23 g of sodium (1 mol), 33 g of aluminum powder (of 95% purity, containing 5% aluminum oxide), 400 ml toluene and 9.2 g of $NaAlH_2[O(CH_2)_2N(CH_3)_2]_2$ equal to 16% by weight of the latter with respect to the amount of sodium and aluminum used. Hydrogen was introduced into the pressure vessel to establish a pressure of 150 atmospheres. The pressure vessel was heated to a temperature of 160° to 170°C. and the pressure therein was kept at the level of 150 atmospheres. The reaction was finished after 4 hours and the pressure vessel cooled and emptied. The solid phase was extracted with tetrahydofuran which was used in a quantity of 200 milliliters per each 10 grams of $NaAlH_4$ obtained. From the tetrahydofuran extract 50.1 g of $NaAlH_4$ was obtained subsequent to evaporation, i.e., 92.6% of the theory.

mixture was neutralized with theoretical amounts of sulfuric or hydrochloric acid. The solution was filtered, the benzene layer removed and 9.4 g of the compound

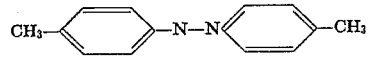

was obtained subsequently to evaporation of benzene. The yield was 92% of the theory.

With the same result, any of the other compounds of the formulae $NaAlH_xQ_{4-x}$, e.g., $NaAlH_2[O(CH_2)_2N(CH_3)_2]_2$, $NaAlH_3[O(CH_2)_2O(CH_2)OCH_3]$,

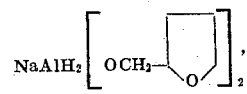

may be used.

EXAMPLE LV

Into a pressure vessel of 1.5 l volume a solution of 67 g of NaAlH$_2$[O(CH$_2$)$_2$OCH$_3$]$_2$ (0.33 mol.) in 500 ml of benzene was charged and a sealed glass ampul containg 27.11g of SiHCl$_3$ (0.2 mol) and 5 stool balls of a diameter of 30 mm were inserted into the vessel. The pressure vessel was closed, flushed three times with nitrgoen introduced at a pressure of 20 atmospheres, and the nitrogen discharged. By a sudden rotation of the pressure vessel the ampul was broken. A spontaneous reaction took place and the pressure rose to 5 atmospheres. The contents of the pressure vessel were emptied into a gas holder and by analysis it was determined that 4.8 l (20°C) of silane or silicon hydride SiH$_4$ was obtained, i.e., 96% of the theory. The other compounds of the general formula NaAlH$_x$Q$_{4-x}$ which are mentioned in Example LIV may also be used and will give similar results.

EXAMPLE LVI

Under conditions identical with those described in Example LV, the reaction of 34 g of silicon tetrachloride (0.2 mol) with 90 g of NaAlH$_2$[O(CH$_2$)$_2$OCH$_3$]$_2$ (0.44 mol) in 500 ml benzene was carried out. The reaction afforded 4.6 (20°C) of silicon hydride, SiH$_4$ i.e., 92% of the theory. Other compounds of the formula g of C$_6$H$_5$SiCl$_3$ (0.1 mol) in 150 ml benzene was carried out. The two solutions were added together over a period of 30 minutes, and thereafter the reaction mixture was refluxed for 30 minutes. In a conventional manner the compound of the formula C$_6$H$_5$SIH$_3$ was isolated and 9.3 g of the said product obtained, i.e., 86% of the theory. Other compounds of the formula NsAlH$_x$Q$_{4-x}$ may be used in a similar manner and with the same result.

EXAMPLES LX to LXII

Into a rotary pressure vessel of 1.5 l working volume, a solution was introduced consisting of 500 ml benzene having dissolved therein NaAlH$_2$[OCH$_2$CH$_2$N(CH$_3$)$_2$]$_2$ in the amounts indicated in Table 4 below, 5 steel balls of a diameter of 30 mm and a sealed glass ampul containing the halide the formula of which and the amount of which are given in Table 4 were also inserted into the pressure vessel. The pressure vessel was flushed with hydrogen and the ampul was caused to break in the manner described in Example LV. The pressure vessel was rotated under heating to a temperature of 100°C. at which temperature the rotating vessel was kept for 2 hours. Upon cooling to 20°C., the gas evolved was discharged into a gas receptacle, the volume of the gas determined and the latter identified by means of gas chromatography.

TABLE 4

| Example | Starting Compounds | | | | Product | |
|---|---|---|---|---|---|---|
| | NaAlH$_2$=[OCH$_2$CH$_2$N(CH$_3$)$_2$]$_2$ | | Alkyl halide | | Hydrocarbon | |
| | in g. | in gram mols | in g | in gram mols | liter /20°C | % |
| LX | 141 | 0.5 | CH$_3$Cl | 50.5 | 1 | CH$_4$ | 23.5 | 94 |
| LXI | 282 | 1 | C$_2$H$_4$Br$_2$ | 188 | 1 | C$_2$H$_6$ | 23.1 | 92 |
| LXII | 141 | 0.5 | C$_2$H$_4$J | 156 | 1 | C$_2$H$_6$ | 23.8 | 95 |

NaAlH$_x$Q$_{4-x}$ may be used in a similar manner and with the same result.

EXAMPLE LVII

Under conditions identical to those of Example LV, the reaction of 21 g SiF$_4$ (0.2 mol) with 90 g NaAlH$_2$[O(CH$_2$)$_2$OCH$_3$]$_2$ (0.44 mol) is 500 ml benzene was carried out, giving 4.85 l of silicon hydride SiH$_4$ i.e., a yield of 97%. Other compounds of the formula NaAlH$_x$Q$_{4-x}$ may be used in a similar manner and with the same result.

EXAMPLE LVIII

Under conditions identical to those of Example LV, the reaction of 30 g CH$_3$SiCl$_3$ (0.2 mol) with

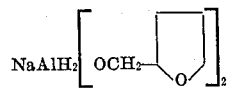

(0.33 mol) in 500 ml benzene was carried out. The reaction afforded 4.44 l of CH$_3$SiH$_3$, i.e., 89% of theory. Other compounds of the formula NaAlH$_x$Q$_{4-x}$ may be used in a similar manner and with the same result.

EXAMPLE LIX

In the apparatus described in Example V, containing a solution of 33.3 g of NaAlH$_2$[OCH$_2$CH$_2$OCH$_3$]$_2$ (0.165 mol) in 200 ml benzene the reaction with 21.1

EXAMPLES LXIII to LXV

Into the apparatus as described in Example V, a solution of

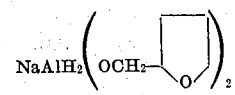

in 300 ml p-xylene was charged (the amount used of the former compound in the individual Examples LXIII to LXV is given in Table 5) Subsequently, the mixture was refluxed under atmospheric pressure. To the refluxing solution was added dropwise within a period of 30 minutes a solution of an aryl halide in 100 milliliters of p-xylene. The aryl halides used and the amounts thereof are also specified in Table 5 hereinafter. The reaction mixture was refluxed for an additional 2 hours. Upon cooling to 20°C., 100 ml water was added, and subsequently, 100 ml of 20% hydrochloric acid. The organic layer was quantitatively separated and neutralized by shaking with 5 ml of a 40% aqueous solution of potassium hydroxide, introduced into a 1 liter measuring flask, and xylene was added up to the required level.

The product was identified, the yield ascertained by means of gas chromatography.

TABLE 5

| Example | NaAlH₂ in g. | [OCH₂–◯–O]₂ in gram mol | Aryl halide (structure) | In g. | In g. mol | Product, hydrocarbon in g. | Yield, percent |
|---|---|---|---|---|---|---|---|
| LXIII | 30.5 | 0.12 | 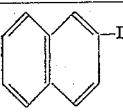 naphthyl iodide | 50.6 | 0.2 | Naphthalene, 24.8 | 96.8 |
| LXIV | 30.5 | 0.12 | 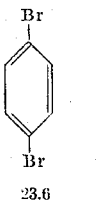 1,4-dibromobenzene | 23.6 | 0.1 | Benzene, 7.3 | 93.5 |
| LXV | 45.7 | 0.18 | 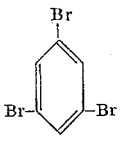 1,3,5-tribromobenzene | 31.5 | 0.1 | Benzene, 7.2 | 92.2 |

EXAMPLE LXVI

A pressure vessel of 2.5 l working volume was charged with 69 g metal sodium (3 mol), 28.4 g of aluminum powder of 90.1% purity (1mol), 114 g of Na₃AlH₆ of 89.8% purity (1 mol), one liter of a xylene solution of 95 g NaAlH₂[OCH₂CH₂N(CH₃)₂]₂, and 1.5 l of steel balls of 5 mm diameter. The pressure vessel was closed, flushed thoroughly with hydrogen, evacuated and heated to a temperature of 185° to 190°C. At this temperature, hydrogen was introduced into the vessel, and the partial pressure of hydrogen was kept in a range of between 0.45 to 0.55 atmosphere. When the reaction was finished and the consumption of hydrogen stopped, the pressure vessel was cooled, emptied, the balls removed and the suspension obtained was treated in the manner described in Example IV. The synthesis afforded 205 g of a slightly grayish matter containing 191 g of trisodium aluminum hexahydride which corresponds to a yield of 94%.

The addition of trisodium aluminum hexahydride to the reaction mixture prior to the actual synthesis is only of importance for the milling of aluminum which otherwise would not proceed. Another material may be also used for this purpose, any inert material, as for instance aluminum oxide will give the desired result. The final product, however, is then contaminated with the inert material added.

As to the choice of the catalyst, the same will apply as stated in Example IV.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In the method of reducing ketones, esters, carboxylic acid halides, and dialkylamides to alcohols and aromatic nitro compounds to azo compounds by reaction of the said compounds in an organic solvent with a reducing agent at an elevated temperature, the improvement which comprises effecting the said reduction in solution in an organic solvent with a reducing agent that is soluble in the said organic solvent, the said reducing agent being a substituted sodium aluminum hydride having the formula $NaAlH_xQ_{4-x}$ in which $x$ is an integer from 1 to 3 and Q is an organic radical derived by the removal of an active hydrogen atom from
   a. a tetrahydrofurfuryl alcohol,
   b. a tetrahydropyranyl alcohol, c. an ether alcohol having the formula

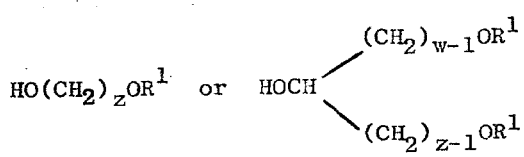

in which $R^1$ is alkyl containing 1 to 4 carbon atoms or phenyl and $w$ and $z$ are each integers from 2 to 4,
   d. a polyether alcohol having the formula $HO(CH_2)_zO(CH_2)_wOR^1$ in which formula members $w$, $z$ and $R^1$ have the same significance as hereinbefore, or
   e. an amino alcohol having the formula $R''R'''N(CH_2)_xOH$ in which $R''$ and $R'''$ each have the same significance as the $R^1$ radical hereinbefore, or an alkoxyalkyl radical having the formula $R^1O(CH_2)_z$, in which formula $R^1$ and $z$ have the same significance as hereinbefore.

2. A method as defined in claim 1 in which the reducing agent is substituted sodium aluminum hydride having the formula $NaAlH_xQ_{4-x}$ in which $x$ is 1 or 2 and Q is an organic radical derived by the removal of an active hydrogen atom from a tetrahydrofurfuryl alcohol.

3. A method as defined in claim 1 in which the reducing agent is a substituted sodium aluminum hydride having the formula NaAlH$_x$Q$_{4-x}$ in which $x$ is 1 or 2 and Q is an organic radical derived by the removal of an active hydrogen atom from a tetrahydropyranyl alcohol.

4. A method as defined in claim 1 in which the reducing agent is a substituted sodium aluminum hydride having the formula NaAlH$_x$Q$_{4-x}$ in which $x$ or 1 or 2 and Q is an organic radical derived by the removal of an active hydrogen atom from an ether alcohol having one of the formulae HO(CH$_2$)$_2$OR$^1$ and

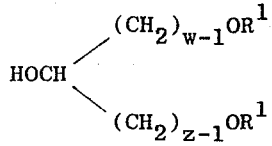

in which formula R$^1$ and $w$ and $z$ have the same significance as in claim 68.

5. A method as defined in claim 1 in which the reducing agent is a substituted sodium aluminum hydride having the formula NaAlH$_x$Q$_{4-x}$ in which $x$ is 1 or 2 and Q is an organic radical derived by the removal of an active hydrogen atom from a polyether alcohol having the formula HO(CH$_2$)$_2$O(CH$_2$)$_w$OR$^1$ in which formula R$^1$ and $w$ and $z$ have the same significance as in claim 68.

6. A method as defined in claim 1 in which the reducing agent is a substituted sodium aluminum hydride having the formula NaAlH$_x$Q$_{4-x}$ in which $x$ is 1 or 2 and Q is an organic radical derived by the removal of an active hydrogen atom from an amino alcohol having the formula R''R'''N(CH$_2$)$_z$OH in which formula R'' and R''' each have the same significance as the R$^1$ radical in claim 68, or are each an alkoxyalkyl radical having the formula R$^1$O(CH$_2$)$_z$ in which formula R$^1$ and $z$ have the same significance as in claim 68.

7. A method as defined in claim 1 in which the sodium aluminum hydride has the formula NaAlH$_2$ in which R is alkyl having 1 to 4 carbon atoms, $m$ is 2 or 3 and $w$ is an integer from 2 to 4.

8. A method of claim 1, wherein the sodium-aluminum hydride is employed in solution in a hydrocarbon, the boiling point of which at atmospheric pressure is lower than the decomposition temperature of said substituted sodium-aluminum hydride.

9. A method as defined in claim 1, wherein the sodium-aluminum hydride has the formula NaAlH$_2$[O(CH$_2$)$_m$OR]$_2$, wherein R is alkyl having 1 to 4 carbon atoms and $m$ is 2 or 3.

10. A method as defined in claim 1, wherein the sodium-aluminum hydride is NaAlH$_2$[O(CH$_2$)$_2$OCH$_3$]$_2$.

11. A method as defined in claim 10 wherein the sodium-aluminum hydride is used in solution in benzene, toluene or xylene.

12. A method as defined in claim 1, wherein the sodium-aluminum hydride is

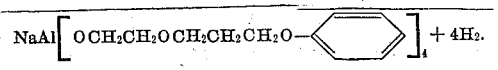

13. A method as defined in claim 1, wherein the sodium-aluminum hydride is NaAlH$_2$[O(CH$_2$)$_m$NR]$_2$, wherein R is alkyl having 1 to 4 carbon atoms and $m$ is 2 or 3.

14. A method as defined in claim 13, wherein the sodium-aluminum hydride is NaAlH$_2$[O(CH$_2$)$_2$N(CH$_3$)$_2$]$_2$.

15. A method as defined in claim 1, wherein the solvent is benzene, toluene or xylene.

16. A method as defined in claim 1, wherein the solvent is tetrahydrofuran.

* * * * *